Figure 1:
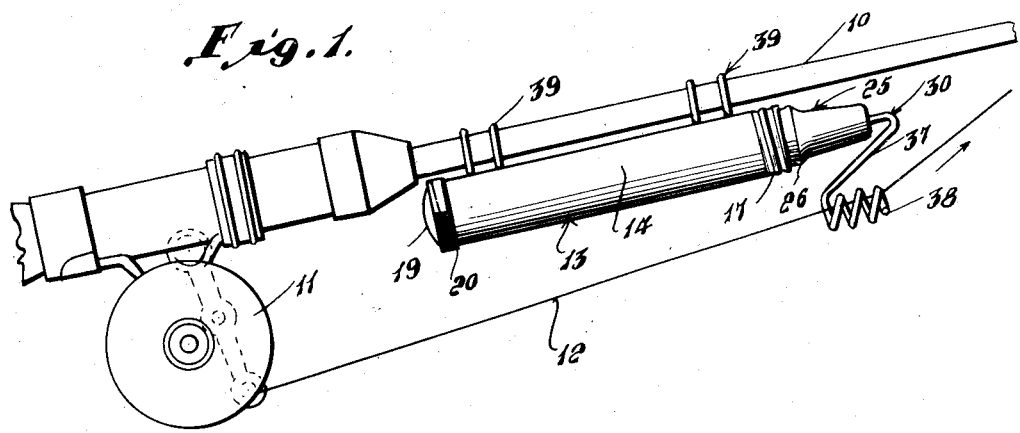

April 9, 1940.　　A. W. SIMMONS ET AL　　2,196,784

FISHING DEVICE

Filed March 23, 1939

Inventors
A. W. Simmons, H. E. Simmons

By L. F. Randolph
Attorney

Patented Apr. 9, 1940

2,196,784

UNITED STATES PATENT OFFICE 2,196,784

FISHING DEVICE

Albert W. Simmons and Herbert E. Simmons, Olean, N. Y.

Application March 23, 1939, Serial No. 263,774

6 Claims. (Cl. 43—17)

This invention relates to an improved fishing device for use in night fishing for producing a visual signal to indicate a bite.

More particularly, it is an aim of this invention to provide an improved self-contained electric light having means for readily detachably mounting it on a fishing rod or pole, and an improved trigger or switch member for said light adapted to be connected to a fishing line and to be actuated thereby for making and breaking a circuit to the light.

Still a further aim of the invention is to provide a flashlight of improved construction provided with hangers for supporting it on a fishing rod or pole and an improved construction of plug adapted to fit the butt end of the flashlight for retaining a battery cell contained therein in engagement with a lamp bulb and provided with an improved switch or trigger projecting therefrom to be actuated by a fishing line for making and breaking a circuit through the casing for energizing and deenergizing, respectively, the lamp bulb.

Still a further aim of the invention is to provide a signaling device of simple construction capable of being economically manufactured and sold and adapted to be readily applied to or removed from fishing rods or poles.

Figure 2:
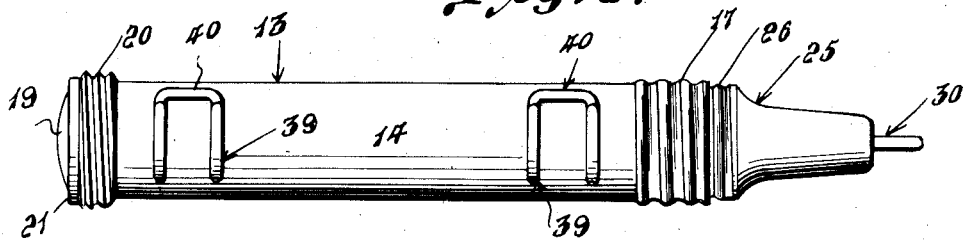
Figure 3:
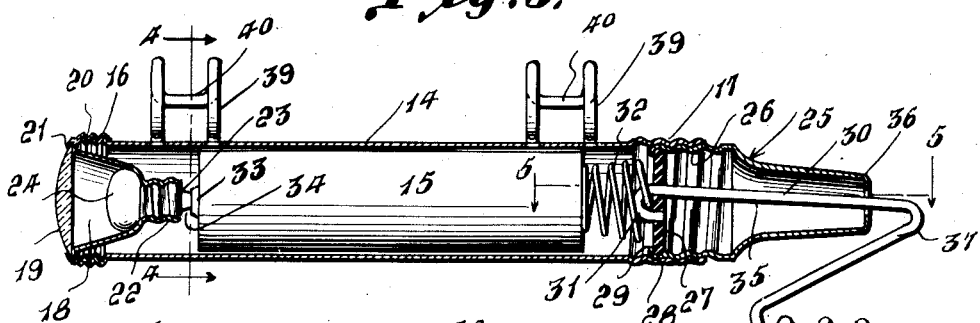
Figure 5:
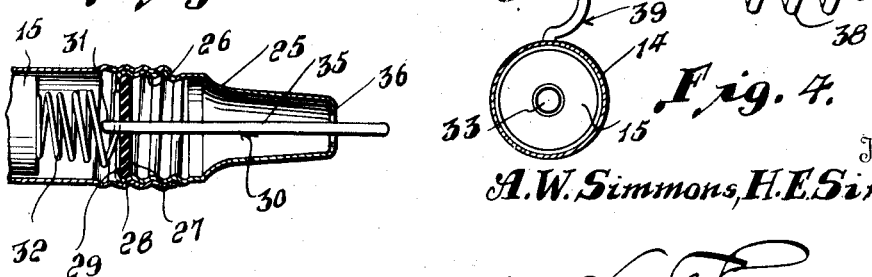
Figure 4:
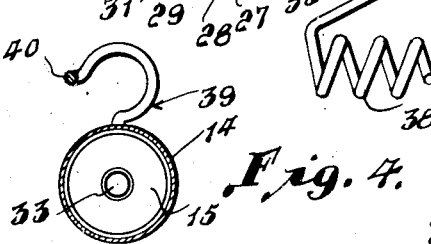

Other objects and advantages of the invention will hereinafter become more fully apparent from the following description of the drawing, which illustrates a preferred embodiment thereof, and wherein:

Figure 1 is a fragmentary side elevational view of a fishing rod or pole showing the signal attached thereto, Figure 2 is a top plan view, on an enlarged scale of the invention, Figure 3 is a longitudinal central vertical sectional view, partly in elevation, of the same, Figure 4 is a transverse vertical sectional view taken along the line 4—4 of Figure 3, and Figure 5 is a longitudinal sectional view taken along the line 5—5 of Figure 3.

Referring more particularly to the drawing, wherein like reference characters designate like or corresponding parts throughout the different views, 10 designates generally a portion of a conventional fishing rod or pole, 11 a fishing reel attached thereto, and 12 a portion of a fishing line which is connected to the reel 11 at one end. These parts are of conventional construction and are shown merely to illustrate the application of the signaling device, comprising this invention and designated generally 13, which will hereinafter be described.

The signaling device 13 comprises a tubular metallic casing 14 which is adapted to contain a battery cell or cells 15 and which is provided with the open threaded ends 16 and 17. A reflector 18 is mounted in the forward end of the casing 14 and is covered by a lens 19 which is held in position on the casing 14 with the reflector 18 by means of the socket 20 which is internally threaded to engage the externally threaded portion 16 and which is provided with the annular inwardly projecting flange 21 which forms a retaining rim to engage the edge of the lens 19. The reflector 18 is provided with a restricted internally threaded inner end 22 in which is mounted the threaded metallic shank 23 of a lamp bulb 24. The metallic shank 23 forms one contact point of the bulb 24 and is connected to the casing 14 through the metallic reflector 18.

A tubular metallic member 25 has the enlarged externally threaded end 26 which is adapted to engage the internally threaded butt end 17 of the casing 14, as best seen in Figure 3. A disk 27, of an insulating material, is mounted in the enlarged end 26 of the member 25 and is held therein by the groove 28 and flange 29. A trigger or switch member, designated generally 30, which is formed from a single strand of relatively heavy gage wire, has one end bent to form the hook 31 which extends through the disk 27 and is then bent back so that its bill end is embedded in the disk and so that the rounded portion of the hook end 31 is spaced slightly from the disk. An expansion coil spring 32 is positioned with one end abutting against the metallic end of the battery cell 15 and its opposite end abutting against the disk 27 with the terminal of said last mentioned end extending through the rounded portion of the hook end 31, as best seen in Figure 5, to make a contact therewith. The disk 27 forms an abutment for one end of the coil spring 32 so that its opposite end, which engages the battery cell 15 urges it toward the forward end of the casing 14 to retain its contact point 33 in engagement with the contact point 34 of the lamp bulb 24.

The trigger member 30 has the shank portion 35 which projects longitudinally outwardly of the tubular member 25. The shank portion 35 projects beyond the restricted end 36 of the tubular member 25 and terminates in the leg 37 which is disposed obliquely and at an acute angle to the shank portion 35. The leg 37 terminates in the spaced coils 38, which are disposed substantially parallel to the axis of the casing 14.

A pair of hanger members 39, each formed from a single strand of wire the ends of which are connected to the casing 14 and the intermediate portions of which are bent to form the hooks 40, are adapted to engage over the rod 10 to support the flashlight 13 thereon with its forward end facing toward the butt end of the rod 10.

The flashlight 13 when thus supported, as illustrated in Figure 1, is disposed so that the leg 37 depends downwardly at substantially an oblique angle and the line 12 is adapted to be threaded through one coil, over the second coil and through the third coil, as illustrated. The normal tendency of the switch member 30, due to the manner in which it is mounted in the disk 27, is upwardly so that in order to hold the switch member 30, in the position as seen in Figure 3, the line 12 between the coil 38 and the reel 11 is held taut to thereby apply a downward pressure on the switch member 30. When the line is pulled by a bite, in the direction as indicated by the arrow in Figure 1, the switch 30 will be urged upwardly so that its shank portion 35 moves into contact with the flange end 36 of the tubular member 25 so that a complete circuit is made from the contact point 33 through contact 34, through the filament of the bulb 24, not shown, through the shank portion 23, the reflector 18, the casing 14, tubular member 25, switch or trigger member 30, and the spring 32 back to the opposite end of the battery cell 15 to energize the lamp 24 to indicate to the fisherman that he has had a bite or strike.

Various modifications and changes in the precise construction and arrangement of the parts forming the invention are contemplated and may obviously be resorted to, and the right is therefore expressly reserved to make such modifications and changes as do not depart from the spirit and scope of the invention as hereinafter defined by the appended claims.

We claim as our invention:

1. A flashlight comprising a metallic casing, a dry cell battery mounted in said casing, a metallic socket connected to one end of said casing, a lamp bulb mounted in said socket with its contact in engagement with the contact of said battery, a tubular tapered metallic member mounted in the opposite end of said casing, the enlarged end of said tubular member being mounted in the casing and being provided with a disk formed of an insulating material, a coil spring disposed between said disk and the metallic end of said battery, and a resilient trigger member having one end mounted in said disk in engagement with an end of said spring, said trigger member projecting outwardly through the restricted end of said tubular member and having its intermediate portion normally disposed in spaced relationship thereto, said trigger member being movable into contact with the tubular member to complete a circuit through the battery and lamp bulb for energizing the bulb.

2. A device as in claim 1, said trigger member being provided with a portion disposed on the outer side of said tubular member and at an acute angle thereto, and said portion terminating in a plurality of coils adapted to be engaged by a fishing line for actuating the trigger member to close a circuit to energize the lamp when the line is drawn therethrough in one direction.

3. A flashlight signaling attachment for fishing rods comprising a metallic tubular member having an enlarged externally threaded end for engaging an internally threaded butt end of a flashlight, a disk of insulating material mounted in said enlarged end, a coil spring having one end abutting against the outer side of said disk and its opposite end engaging the metallic end of a battery cell forming a part of the flashlight, and resilient means mounted in said disk and connected with said spring, said means projecting outwardly through the opposite end of said tubular member and being movable laterally thereof, into and out of engagement therewith, for making and breaking a circuit through the battery for energizing a lamp bulb connected to the opposite end of the battery.

4. A flashlight signaling attachment for fishing lines comprising a metallic member tubular in construction having an enlarged externally threaded end adapted to engage the internally threaded butt end of a flashlight casing, a disk of insulating material mounted in said enlarged end, an expansion coil spring having one end abutting against the disk and its opposite end engaging the metallic end of a battery cell, and a resilient trigger member having one end secured to said disk and in engagement with said spring, said trigger member projecting longitudinally through the tubular member and being movable laterally relatively thereto, into and out of engagement with its opposite open end for making and breaking a circuit through the battery.

5. A device as in claim 4, said trigger member terminating in an obliquely disposed end, and said obliquely disposed end terminating in a plurality of coils adapted to engage a fishing line for moving the trigger member into and out of engagement with said tubular member.

6. A flashlight signalling attachment for fishing lines comprising a flashlight having means for detachably mounting it on a fishing rod, said flashlight including a switch comprising a tapered tubular member, open at its ends, the enlarged end of said member being detachably mounted in the butt end of the flashlight casing, a disk of insulating material mounted in said end, a spring having one end abutting against the disk and its opposite end engaging against the metallic end of a battery cell disposed in the flashlight, and a trigger member comprising a strand of resilient wire having one end secured to said disk and engaging the spring, said trigger member extending outwardly through the restricted end of the tubular member and having its opposite end angularly disposed relatively to the secured end, said opposite end being engageable by a fishing line for moving the trigger member into engagement with the tubular member for energizing the flashlight.

ALBERT W. SIMMONS.
HERBERT E. SIMMONS.